No. 884,245.
PATENTED APR. 7, 1908.
F. A. WAUGH.
SURVEYING INSTRUMENT.
APPLICATION FILED JUNE 15, 1907.
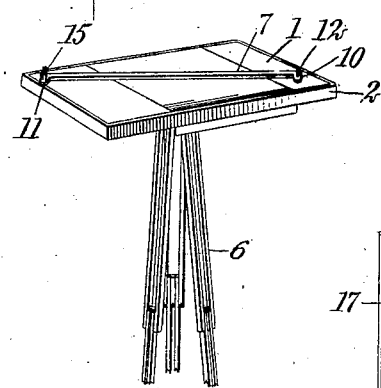
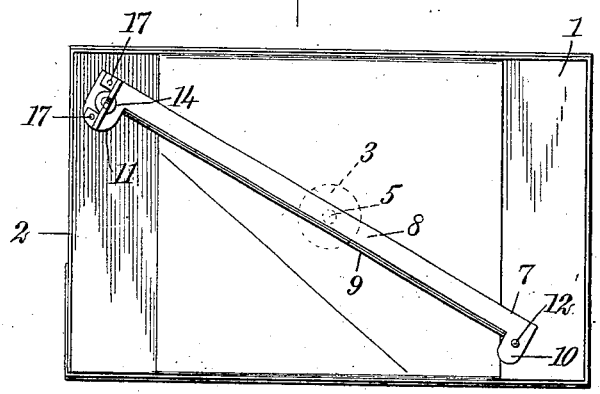
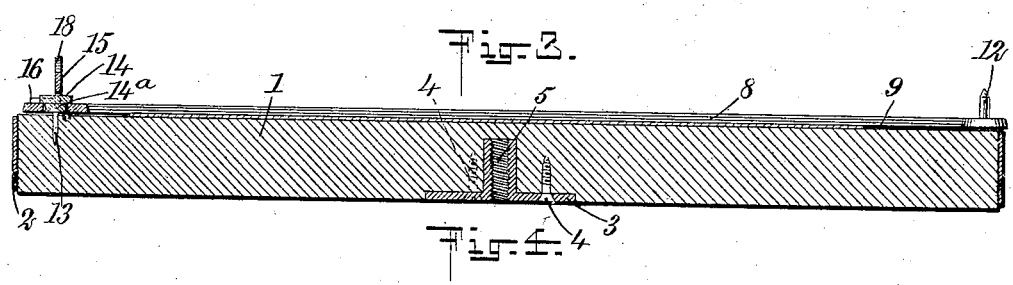
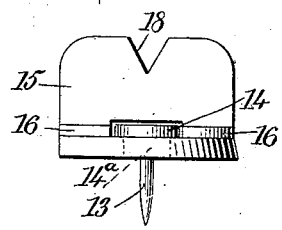
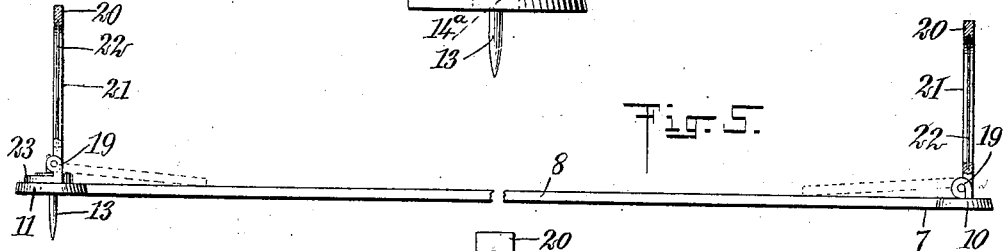
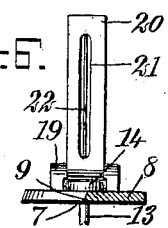
WITNESSES
INVENTOR
Frank A. Waugh
BY
ATTORNEYS

UNITED STATES PATENT OFFICE.

FRANK ALBERT WAUGH, OF AMHERST, MASSACHUSETTS.

SURVEYING INSTRUMENT.

No. 884,245.  Specification of Letters Patent.  Patented April 7, 1908.

Application filed June 15, 1907. Serial No. 379,153.

*To all whom it may concern:*

Be it known that I, FRANK ALBERT WAUGH, a citizen of the United States, and a resident of Amherst, in the county of Hampshire and State of Massachusetts, have invented a new and Improved Surveying Instrument, of which the following is a full, clear, and exact description.

This invention relates to surveying instruments, and more particularly to that class of surveying instruments known as plane tables.

The object of the invention is to provide a simple, strong and inexpensive surveying instrument having a drawing-board constituting a plane table and an adjustable alidade adapted to be pivotally mounted upon the board at a plurality of points.

A further object of the invention is to provide a device of the class described, having means for removably mounting the same upon a support such as a camera tripod, and provided with adjustable means for easily and firmly securing the drawing paper or the like upon the board.

The invention consists in the construction and combination of parts to be more fully described hereinafter and particularly pointed out in the claims.

Reference is to be had to the accompanying drawings, forming a part of this specification, in which similar characters of reference indicate corresponding parts in all the views, and in which Figure 1 is a perspective view showing my invention mounted upon a camera tripod; Fig. 2 is a plan view of the device; Fig. 3 is a vertical section of the board, showing the alidade thereupon; Fig. 4 is an end view of the alidade; Fig. 5 is an elevation of a modified form of alidade; and Fig. 6 is a transverse section of the modified form of alidade shown in Fig. 5.

The instrument commonly characterized as a "plane table" has been found of great utility in various kinds of surveying, for instance, the ascertaining of lines or directions of roads, rivers, and the like, laying out of boundary lines, locating all kinds of objects, and for various other purposes of engineering, landscape gardening, and military surveying.

My invention will be found of particular utility in surveying where rapidity of operation is as essential as accuracy. The device is small and compact in form and can easily be carried in a large pocket. I prefer to use it mounted upon a support such as a camera tripod, but in very rapid location surveys or in reconnaissances and the like it may answer the purpose to hold the device in the hand.

Referring more particularly to the drawings, 1 represents a drawing-board, preferably rectangular in form and fashioned from any common or preferred material. Certain species of wood lend themselves readily to this purpose and I prefer to make the board of such material. An endless band 2, of metal or other suitable material approximating in form the outline of the drawing-board, is removably mounted around the latter at the edges and serves to secure the paper upon the board by clamping the edges of the sheet between the chamfered edges of the board and the band. At the under side of the board is mounted a screw socket 3 held in position by means of screws 4. The socket 3 has a centrally threaded sleeve 5 by means of which it can be easily mounted upon a correspondingly threaded pin of the support, for instance a camera tripod 6 said pin being held in position by said sight-member.

I prefer to employ in connection with the board an alidade 7 having an elongated blade body 8 presenting a fiducial edge 9; at the ends, the alidade has lateral extensions 10 and 11. The extension 10 carries a sight-pin or bead 12 in alinement with the edge 9. At the opposite end the extension 11 has an opening therethrough in which is arranged a pin 13 having an extended part 14ª and a head 14, resting against the upper face of the alidade. A sight-member 15 is secured upon the alidade extension 11, by means of laterally disposed feet 16 arranged one at each side of the head 14 and held in place by means of screws or rivets 17. The sight-member 15 extends across the head 14 and holds the pin in position. The latter serves for removably and pivotally mounting the alidade at any desired point of the board by forcing the pin into the wood, for instance, as a thumb-tack is forced into a drawing-board. The sight-member 15 has a sight-notch 18 alined with the fiducial edge 9. By means of the sight-bead 12 and the sight-notch 18, sights are taken along the alidade to the point chosen in the course of the surveying.

A modified form of alidade having folding bar sights can be used in connection with my invention. A form of such bar sight alidade is illustrated in Figs. 5 and 6. At the ends of the alidade are hinged brackets 19 at which are pivotally mounted foldable bars 20 having elongated slots 21 in which the sight hairs 22 are mounted. The bracket 19 at the end of the alidade which carries the pin 13 has laterally disposed feet 23 and extends across the head 14 as does the sight member 15, to hold the pin 13 against displacement.

The manner of using the plane table for various kinds of surveying operations is well known, and it is peculiarly well adapted for many diverse uses, for instance, for field work in engineering, reconnaissance surveys, landscape gardening projects, gardeners' designing, military surveying, and topography. As an example of the use of the device it may be assumed that the direction or course of a road or river is to be ascertained. After the paper has been adjusted upon the board, the operator mounts the device upon a support such as a tripod, at a certain point, and selects an object or point of known distance upon the road or river and sights to it along the alidade. A line is then drawn against the fiducial edge of the alidade and equal in length to the distance of the chosen object according to the scale upon which the drawing is to be made. The operator then advances to the object to which a sight has just been made and selects a second object and sights along the alidade, which has been shifted upon the board so that the line sighted to the second object starts at the point representing the first object upon the first line drawn. This operation is repeated until the entire course is laid out.

Having thus described my invention, I claim as new and desire to secure by Letters Patent:—

1. In a surveying instrument, an alidade having a blade member presenting an edge and having at opposite ends, sights adapted to co-act to permit the accurate sighting of the alidade, said sights being in alinement with said edge of said blade member, and near one end a pin adapted to be forced into a drawing board, said pin being loosely carried by said blade member.

2. In a surveying instrument, an alidade having a blade member presenting an edge, and having at opposite ends respectively a bead sight and a notch sight, said sights being in alinement with said edge of said blade member, and a pin near one end of said blade member and adapted to be forced into a drawing board, said pin being loosely carried by said blade member, and having a head serving to hold said pin in position.

3. In a surveying instrument, an alidade having a blade member presenting an edge and having at opposite ends respectively, a bead sight and a notch sight, said sights being in alinement with said edge of said blade member, and a pin near one end adapted to be forced into a drawing-board, said pin being loosely carried by said blade member.

4. In a surveying instrument, an alidade having a blade member presenting a fiducial edge and provided with lateral extensions at the opposite ends, a sight carried by each of said extensions, said sights serving to permit the exact sighting of the alidade and being in alinement with said edge of said blade member, one of said extensions having an opening therethrough, and a pin having a head movably arranged in said opening and provided with a flange engaging at the edge of said opening, the sight of said extension carrying said pin extending across said head to hold said pin in position.

5. In a surveying instrument, an alidade having a blade-member presenting a fiducial edge and having extensions at the opposite ends, one of said extensions having a bead-sight, the other of said extensions having a sight-member presenting a notch, said bead-sight and said notch being in alinement with said edge of said blade-member, and a pin adapted to be forced into a drawing-board and presenting a head engaging said sight member, said pin being held in position by said sight member.

6. In a surveying instrument, an alidade having a blade-member presenting a fiducial edge and provided with lateral extensions at the opposite ends, one of said extensions having a bead-sight in alinement with said edge of said blade member, the other of said extensions having an opening therethrough, a pin located in said opening and having a head, and a sight-member mounted upon said extension having said opening and extending across said head to hold said pin in position, said sight-member having a notch in alinement with said edge of said blade-member.

In testimony whereof I have signed my name to this specification in the presence of two subscribing witnesses.

FRANK ALBERT WAUGH.

Witnesses:
CORNELIA B. BALL,
C. S. POMEROY.